June 24, 1941.  P. N. SANDSTROM  2,246,816
CURRENT RESPONSIVE PROTECTIVE RELAY SYSTEM
Filed March 29, 1940
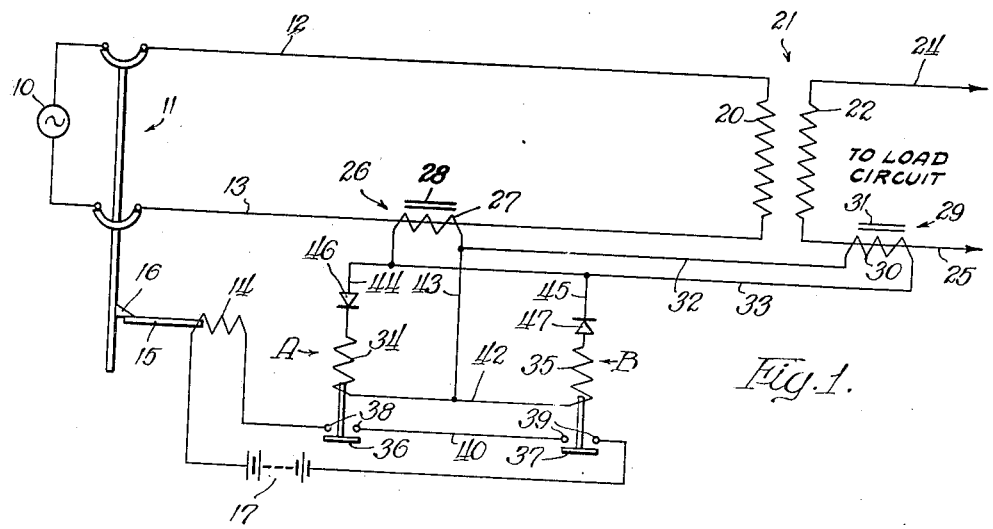
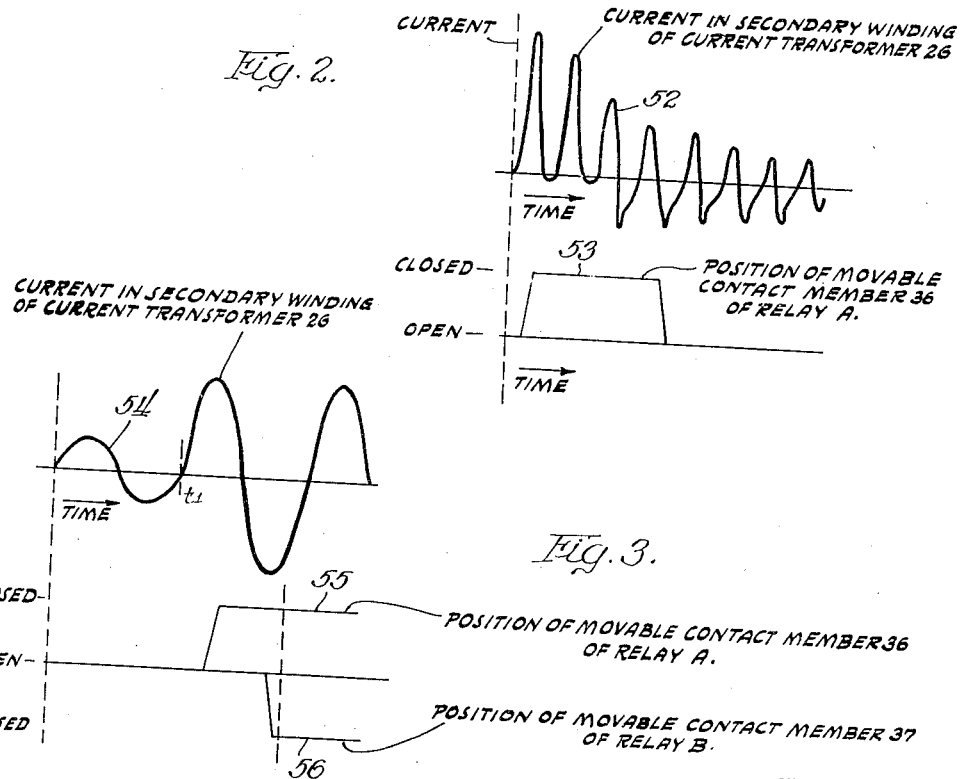
Inventor:
Per N. Sandstrom
By Brown Jackson Boettcher Dienner
Attys Patented June 24, 1941

2,246,816

UNITED STATES PATENT OFFICE 2,246,816

CURRENT RESPONSIVE PROTECTIVE RELAY SYSTEM

Per N. Sandstrom, Chicago, Ill.

Application March 29, 1940, Serial No. 326,596

4 Claims. (Cl. 175—294)

My invention relates, generally, to protective systems for alternating current circuits and it has particular relation to current responsive relay systems.

An object of my invention is to increase the sensitivity of current responsive relay systems.

Another object of my invention is to provide for distinguishing, in a current responsive protective relay system, between transient over current conditions and fault current conditions.

A further object of my invention is to provide, in a current responsive protective relay system, for distinguishing between asymmetrical over currents and symmetrical over currents.

A still further object of my invention is to overcome, in a current responsive protective relay system, the effects of direct current saturation of the core of the current transformer employed for operating the system.

Another object of my invention is to increase the sensitivity of a differential current protective relay system operated by current transformers connected in an alternating current circuit by making the system insensitive to differential current flow resulting from direct current saturation of the cores of the current transformers and asymmetrical current flow in the alternating current circuit.

Another object of my invention is to provide in a current responsive protective relay system, for distinguishing between the magnetizing in-rush current of power transformers and load currents or through fault currents.

Other objects of my invention will, in part, be obvious and in part appear hereinafter.

My invention, accordingly, is disclosed in the embodiments thereof shown in the accompanying drawing, and it comprises the features of construction, combination of elements and arrangement of parts which will be exemplified in the system hereinafter set forth, and the scope of the application of which will be indicated in the appended claims.

For a more complete understanding of the nature and scope of my invention, reference may be had to the following detailed description, taken in connection with the accompanying drawing, in which:

Figure 1 illustrates diagrammatically how my invention can be employed either as an over current responsive system or a differential current responsive system; and Figures 2 and 3 show curves which illustrate certain operating characteristics of my invention.

Referring now particularly to Figure 1 of the drawing, it will be observed that the reference character 10 designates a source of alternating current. This source may be a conventional 60-cycle source and, while only a single phase system has been illustrated, it will be understood that the present invention is equally applicable to a polyphase system, the single phase system having been shown in order to simplify the disclosure of the invention.

The alternating current source 10 is connected by means of a conventional circuit breaker, shown generally at 11, to conductors 12 and 13. The circuit breaker 11 is provided with a trip winding 14 which is arranged to attract a latch member 15 which, when positioned underneath a detent 16, serves to hold the circuit breaker 11 in closed position. The trip winding 14 is arranged to be energized from a suitable source, such as a battery 17, in a manner to be hereinafter set forth, for moving the latch member 15 out of the path of the detent 16 to permit the circuit breaker 11 to be operated to the open circuit position.

The conductors 12 and 13 are connected to energize a primary winding 20 of a transformer, shown generally at 21. The transformer 21 is provided with a secondary winding 22 which, as shown, is connected to a load circuit comprising conductors 24 and 25.

Associated with the conductor 13 is a current transformer, shown generally at 26. The conductor 13 provides the primary winding for the transformer 26. It has a secondary winding 27 disposed on a core 28 in accordance with conventional practice. The current transformer 26 can be employed, as will hereinafter appear, either in conjunction with an over current protective relay system or in conjunction with a differential current protective system.

For the differential current protective system a current transformer, shown generally at 29, is provided. It is associated with the conductor 25, which forms the primary winding therefor. A secondary winding 30 is provided on a core 31, again in accordance with conventional practice.

In accordance with conventional over current protection practice, the secondary winding 27 of the current transformer 26 would be connected to a conventional type of over current relay. That is, the secondary winding 27 would be connected to the operating winding of an over current relay. On the occurrence of a predetermined over current flow in the conductors 12 and 13, the over current relay would be operated in such manner as to energize the trip winding 14 and effect the opening of a circuit breaker 11. In such case it is desirable that the over current relay operate to trip the circuit breaker only in the event that a fault condition exists. However, such an over current relay is not only responsive to fault current conditions, but also it is responsive to transient current conditions which, in some respects, may have the same effect as fault currents. However, because of the transient character of these currents as compared to fault currents, it is undesirable that the circuit breaker 11 be tripped out as a result of these transient currents, since they quickly disappear.

As a result of the occurrence of a fault on the system when this invention is applied as a differential protective system and the fault is outside of the zone of protection the core 28 of the current transformer 26 may become saturated to a greater or lesser extent, depending upon the magnitude of the direct current component of the fault current. As a result of this saturation, sufficient current may flow through the operating winding of a conventional over current relay to effect the tripping of the circuit breaker controlled thereby, even though no fault exists on the part of the system protected by this differential protective system.

According to prior practice, the conventional over current relay is so arranged that it will not operate as a result of the current flow through its operating winding due either to the occurrence of a transient condition or to current flow which is abnormal because of the saturation of the core of the current transformer. This differentiation is effected by so adjusting the over current relay that it is responsive only to currents in excess of the magnitudes of the currents likely to be encountered under these conditions. Obviously, then, the over current relay, when so adjusted, is relatively insensible to low fault currents and does not afford the degree of protection which is desired.

If the transformer 26 is employed in conjunction with the current transformer 29 in a differential current protective system, then, as shown, the secondary windings 27 and 30 are connected in parallel circuit relation by conductors 32 and 33 so that under normal operating conditions the same current flows through both of them. The winding of the conventional over current relay is connected across this parallel connection and, under normal operating conditions, no current flows through it. However, in the event that a fault occurs in the device, such as the transformer 21, between the transformers 26 and 29, then more current flows through one of the secondary windings of the current transformers than through the other and consequently the winding of the over current relay is energized to effect the operation of a circuit breaker, such as the circuit breaker 11. Of course, it is desirable that the over current relay in the differential current protective system function only on the occurrence of an actual fault in the device protected. However, in accordance with prior art practice, the current responsive relay in the differential current protective system must be so adjusted that it is insensitive to the conditions previously described which do not involve the occurrence of a fault in the device protected. Consequently, the differential relay systems of the prior art are not as sensitive to the occurrence of a fault condition as desired, because it is necessary to obviate, in so far as possible, a false operation resulting from causes other than the occurrence of a fault.

I have observed that the undesirable over current conditions, aside from the normal fault current conditions, are accompanied, in the majority of instances, by positive or negative resultant components of current flow. The current responsive relays of the prior art are generally arranged to be responsive to the magnitude of the over current without regard to its polarity. For example, when the circuit breaker 11 is closed to energize the transformer 21, there may be an inrush of current to the primary winding 20 which is considerably greater in magnitude than the normal load current. This is due to the condition in which the core of the transformer 21 was left when the primary winding 20 was previously deenergized and the point on the voltage wave at which the circuit is completed. This initial inrush current is predominantly positive or negative, or is asymmetrical rather than symmetrical. Since it quickly disappears as the system settles down to steady state operating conditions, it is undesirable that any relaying action take place as a result of this.

With a view to differentiating between actual fault current conditions and conditions which may have the semblance of fault current conditions, I employ two relays A and B instead of a single relay, in accordance with the conventional prior art practice. The relays A and B are provided, respectively, with operating windings 34 and 35, movable contact members 36 and 37, and stationary contact members 38 and 39. It will be understood that, when the operating windings 34 and 35 are properly energized, the movable contact members 36 and 37 are moved to bridge the corresponding stationary contact members 38 and 39. These stationary contact members are connected in series circuit relation by a conductor 40. It will be apparent that both sets of stationary contact members 38 and 39 must be bridged in order to complete the series circuit connection therethrough and, since they are connected in series circuit relation with the trip winding 14 and the battery 17, both of the relays A and B must be operated in order to energize this trip winding and trip the circuit breaker 11 to the open circuit position.

It will be observed that the operating windings 34 and 35 are commonly connected together by a conductor 42 and are connected by a conductor 43 to one terminal of the secondary winding 27 of the current transformer 26. The operating windings 34 and 35 are connected by conductors 44 and 45 to the other terminal of the secondary winding 27.

Since over current conditions which are not actual fault current conditions are accompanied by predominantly positive or negative current flows, I take advantage of this phenomena and provide a relay system which requires for its operation to energize the trip winding 14 of the circuit breaker 11 a predetermined magnitude of both positive and negative half cycles of current but which system will not cause operation for only one of these polarities. In the system shown in Figure 1 this is accomplished by polarizing the relays A and B by means of rectifiers 46 and 47 which are connected in the circuits of the operating windings 34 and 35. The rectifiers 46 and 47 are oppositely connected so that, for example, only positive half-cycles of alternating current flow through the operating winding 34 and negative half-cycles of alternating current flow through the operating winding 35. The rectifiers 46 and 47 may be of the conventional dry type, such as the copper oxide film type, or they may be any other suitable type of rectifier.

Referring now to the curves shown in Figure 2 of the drawing, it will be observed that the curve 52 illustrates the current that may flow in the secondary winding 27 of the current transformer 26 when the circuit break 11 is closed to energize the primary winding 20 of the transformer 21. The initial cycles of this current flow are predominantly positive. Since this current flow often exceeds the normal current flow in the circuit under steady state operating conditions, it is likely to cause operation of the conventional type of over current relays and to trip out the circuit breaker. This is not the case when the construction according to this invention is employed. The curve 53 in Figure 2 shows the position of the movable contact member 36 of the relay A under the assumed conditions. It will be observed that this movable contact member is operated to a position where the stationary contact members 38 are bridged. However, since the current flow is predominantly positive, only relay A is operated, rectifier 47 preventing relay B from functioning. As a result, the stationary contact members 39 are not bridged and the circuit for energizing the trip winding 14 is not completed. As soon as the system settles down to the steady state operating condition, sufficient positive half-cycles of alternating current cease to flow through the operating winding 14 to hold the movable contact member 36 in the closed position and, as a result, it drops to the open position.

When means are provided, such as the rectifiers 46 and 47, for polarizing the relays A and B, it is unnecessary to adjust the current responsive relay means so that it will be insensitive to these particular over current conditions. This is equally true whether the system is arranged for protection against the occurrence of fault currents or for differential current protection resulting from the occurrence of a fault within the device protected.

Considering now the curves shown in Figure 3 of the drawing, it will be noted that the curve 54 shows the current that flows in the secondary winding 27 of the current transformer 26. The initial part of this curve shows the current flow under normal operating conditions. It will first be assumed that only the secondary winding 27 of the transformer 26 is connected to the relays A and B. On the occurrence of a fault on the system at the time $t^1$, the current in the secondary winding 27 of the transformer 26 will correspondingly increase. As shown by curve 55, the movable contact member 36 of relay A will shortly thereafter be operated and subsequently, as shown by curve 56, the movable contact member 37 of relay B will be operated to the closed position. Since the series circuit for energizing the trip winding 14 has now been completed, the circuit breaker 11 will be tripped in order to clear the fault.

This same sequence of operations as illustrated by the curves in Figure 3 will take place in the event that the secondary winding 30 of the current transformer 29 is connected, as shown in the drawing, by conductors 32 and 33 to the secondary winding 27 of the current transformer 26 and a fault occurs, such as a short circuit, in one of the windings 20 and 22 of the transformer 21. In such case the current flow through the secondary winding 27 of the current transformer 26 would increase over the current flow in the secondary winding 30 of the current transformer 29 and, as described, the circuit breaker 11 would be tripped to the open circuit position.

Since certain changes may be made in the above system and different embodiments of the invention may be made without departing from the scope thereof, it is intended that all matter contained in the foregoing description or shown in the accompanying drawing shall be interpreted as illustrative and not in a limiting sense.

I claim as my invention:

1. In a protective system for an alternating current circuit in which transient conditions are likely to occur accompanied by asymmetrical current flow, in combination, a pair of relays each including a winding and normally open contact means controlled thereby, each relay once its winding is energized by a half cycle of one polarity sufficiently to effect closure of its contact means being adapted to keep the same closed as long as such half cycles continue to flow, the contact means of said relays being connected in series circuit relation, circuit means connecting said relay windings for energization to the alternating current circuit, and a rectifier individual to each relay winding connected in said circuit means so that positive half cycles of alternating current flow through one relay winding and negative half cycles of alternating current flow through the other relay winding whereby both said contact means are operated to the closed position and a circuit therethrough is completed only on flow of predetermined amounts of current through both of said relay windings.

2. In a protective system for an alternating current circuit, in combination, a current transformer including a winding inductively related to the alternating current circuit and a core that is likely to be saturated by direct current components of current flow in the alternating current circuit, a pair of relays each including a winding and normally open contact means controlled thereby, each relay once its winding is energized by a half cycle of one polarity sufficiently to effect closure of its contact means being adapted to keep the same closed as long as such half cycles continue to flow, the contact means of said relays being connected in series circuit relation, circuit means connecting said windings for energization to said current transformer winding, and a rectifier individual to each relay winding connected in said circuit means so that positive half cycles of alternating current flow through one relay winding and negative half cycles of alternating current flow through the other relay winding in varying amounts depending upon the degree of saturation of said core whereby both said contact means are operated to the closed position and a circuit therethrough is completed only on flow of predetermined amounts of current through both of said relay windings.

3. In a protective system for an electrical device having a plurality of windings for connection in an alternating current circuit in which transient conditions are likely to occur accompanied by asymmetrical current flow, in combination, a pair of interconnected windings inductively related to the current flowing in said windings, a pair of relays each including a winding connected to be responsive to unbalanced current flow between said pair of windings and normally open contact means controlled thereby, each relay once its winding is energized by a half cycle of one polarity sufficiently to effect closure of its contact means being adapted to keep the same closed as long as such half cycles continue to flow, the contact means of said relays being connected in series circuit relation, and a rectifier individual to each relay winding and connected thereto in such manner that positive half cycles of alternating current flow through one relay winding and negative half cycles flow through the other relay winding whereby both said contact means are operated to the closed position and a circuit therethrough is completed only on flow of predetermined amounts of current through both of said relay windings.

4. In a protective system for an electrical device having a plurality of windings for connection in an alternating current circuit in which transient conditions are likely to occur accompanied by asymmetrical current flow, in combination, a pair of interconnected windings inductively related to the current flowing in said windings, a core associated with each of said interconnected windings likely to be saturated by direct current components of current flow in the alternating current circuit, a pair of relays each including a winding connected to be responsive to unbalanced current flow between said pair of windings and normally open contact means controlled thereby, each relay once its winding is energized by a half cycle of one polarity sufficiently to effect closure of its contact means being adapted to keep the same closed as long as such half cycles continue to flow, the contact means of said relays being connected in series circuit relation, and a rectifier individual to each relay winding and connected thereto so that positive half cycles of alternating current flow through one relay winding and negative half cycles of alternating current flow through the other relay winding in varying amounts depending upon the degree of saturation of said cores whereby both of said contact means are operated to the closed position and a circuit therethrough is completed only on flow of predetermined amounts of current through both of said relay windings.

PER N. SANDSTROM.